United States Patent [19]

Dukatz et al.

[11] Patent Number: 5,135,285
[45] Date of Patent: Aug. 4, 1992

[54] TWIN SHOULDER BELT ADJUSTMENT MECHANISM FOR A CHILD RESTRAINT SYSTEM

[75] Inventors: Matthew E. Dukatz, Bloomfield Hills; Fred C. Kresky, Rochester Hills; George S. Popa, Troy; Mariano T. Cadiz, Rochester Hills, all of Mich.

[73] Assignee: Chrysler Corporation, Highland Park, Mich.

[21] Appl. No.: 742,826

[22] Filed: Aug. 9, 1991

[51] Int. Cl.$^5$ ............................................. B60R 21/00
[52] U.S. Cl. .................................. 297/484; 297/112; 297/250; 297/219
[58] Field of Search ............... 297/484, 112, 238, 191, 297/467, 468, 483, 485, 486, 229, 219, 250

[56] References Cited

U.S. PATENT DOCUMENTS

| | | | |
|---|---|---|---|
| 3,910,634 | 10/1975 | Morris | 297/484 X |
| 4,768,828 | 9/1988 | Kohketsu | 297/250 |
| 4,882,213 | 11/1989 | Gaddis et al. | 297/219 X |
| 4,979,777 | 12/1990 | Takada | 297/250 |
| 4,986,600 | 1/1991 | Leblanc et al. | 297/112 X |

Primary Examiner—Laurie K. Cranmer
Attorney, Agent, or Firm—Edward P. Barthel

[57] ABSTRACT

A twin shoulder belt adjustment mechanism for a child restraint system, including a plurality of vertically spaced apart and slightly vertically offset restraint slots for holding the belts in use. Respective adjustment slits extend laterally from the restraint slots, with a downwardly extending connector slit interconnecting and extending beyond the outer ends of the lateral adjustment slits, such that the twin belts may be moved therethrough to a higher or lower pair of restraint slots to accommodate a different size child.

8 Claims, 2 Drawing Sheets

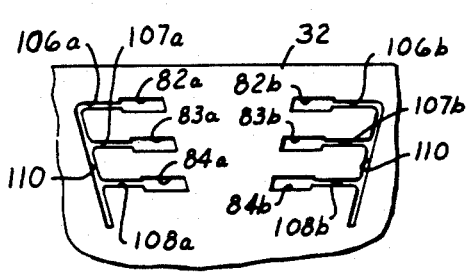
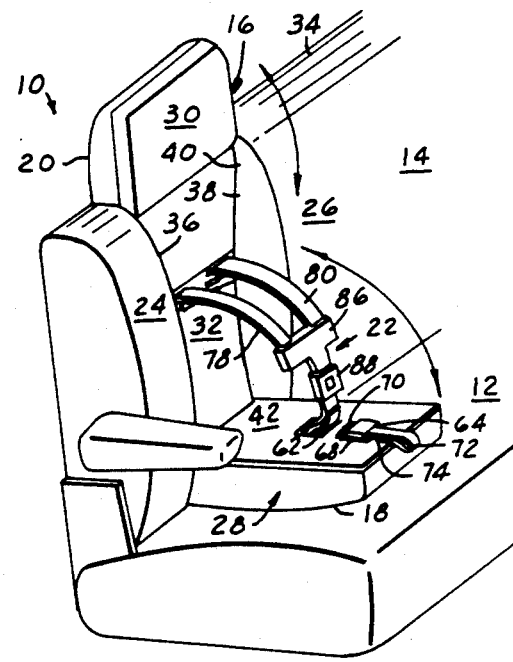
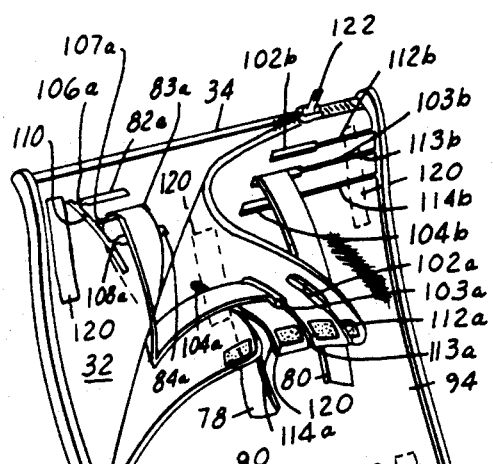
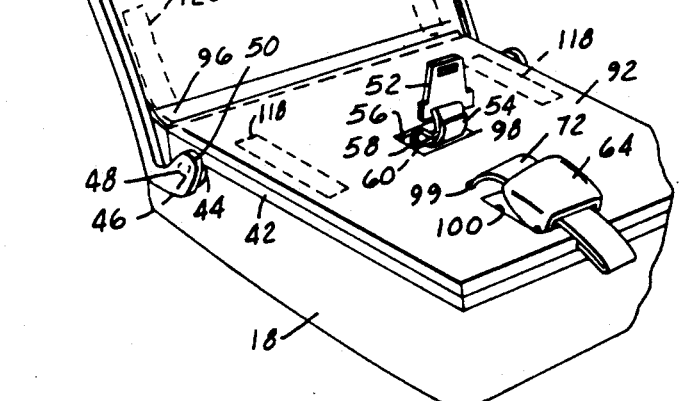
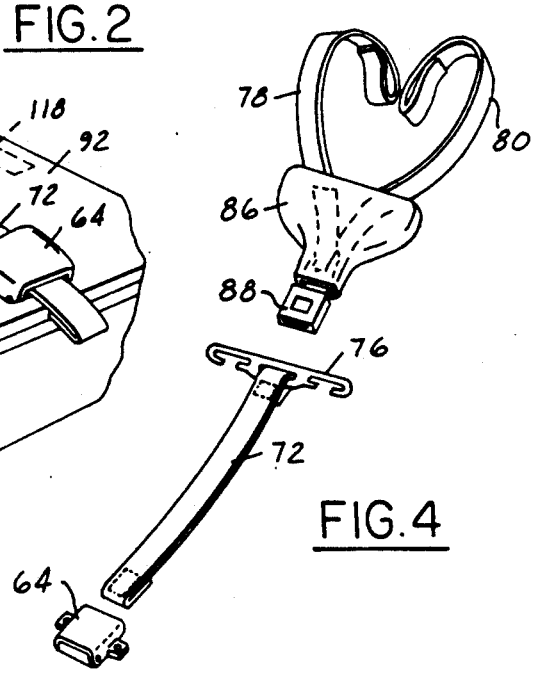

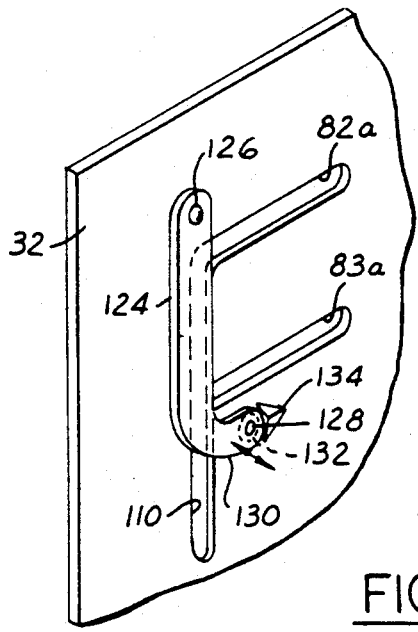 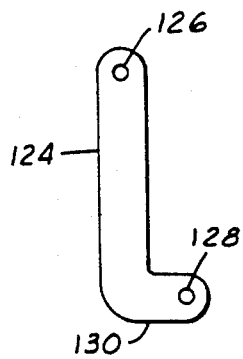 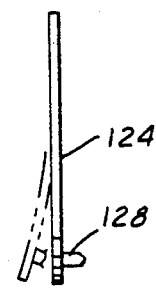
FIG.5  FIG.6  FIG.7
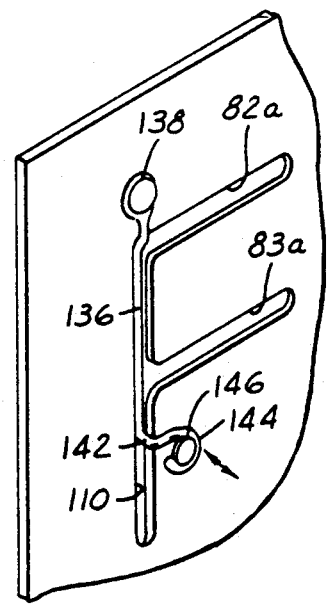 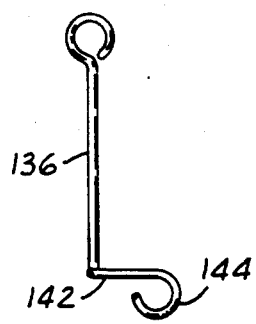 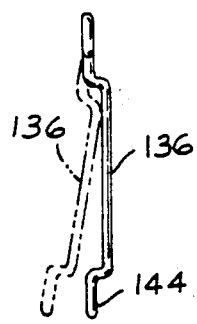
FIG.8  FIG.9  FIG.10

TWIN SHOULDER BELT ADJUSTMENT MECHANISM FOR A CHILD RESTRAINT SYSTEM

TECHNICAL FIELD

This invention relates generally to automotive child restraint systems and, more particularly, to such systems having provisions for adjustment of twin shoulder belts to accommodate different size toddlers.

BACKGROUND ART

Various shoulder height adjustment arrangements for seat belt systems are known. For example, Wener U.S. Pat. No. 3,922,035 discloses a vehicle seat structure for children having two sets of three vertically aligned guide apertures through which twin shoulder belts are extended. In order to accommodate children of varying sizes, the twin belts must be pulled out of one set of guide apertures and re-threaded through a different set.

Kohketsu U.S. Pat. No. 4,768,828 is similar in its adjustment arrangement to that of Wener, and additionally refers to a prior art arrangement having upper and lower belt holes through which twin shoulder belts are passed.

Krzor U.S. Pat. No. 4,225,185 discloses a vertically adjustable mounting arrangement for safety belts at a side rail of a vehicle, including a mounting plate having a vertical slot formed therein, with a plurality of spaced apart lateral slots extending therefrom with drop slots at the ends thereof. An adjusting pin or bolt holding the safety belt may be moved upwardly from one drop slot, transferred through its lateral slot and then vertically in the vertical slot so as to be dropped downwardly into a different drop slot.

Pollitt et al. U.S. Pat. No. 4,236,755 discloses a shoulder height adjuster for seat belt systems, including a connector having a split therein for connecting two separate belts, and wherein the connector is slidable on one of the two belts.

Perdelwitz, Jr. et al. U.S. Pat. No. 4,885,200 discloses a disposable infant seat liner for use with separate infant car seats, and including vertically spaced apart slits or slotways adapted to being selectively aligned with the strap locations of various car seat models.

Lablanc et al. U.S. Pat. No. 4,986,600 discloses oppositely disposed columns of comb-like structures, wherein shoulder straps are inserted between selected adjacent tines and retained therein by upturned flanges on the lower supporting tines. No transfer slits are provided for the respective tines.

DISCLOSURE OF THE INVENTION

A general object of the invention is to provide an improved twin shoulder belt adjustment mechanism for a child restraint system for a child weighing more than 20 pounds.

Another object of the invention is to provide a twin shoulder belt adjustment mechanism for a child restraint system, wherein the adjustment may be easily and quickly accomplished, without having to pull out the belts and re-thread them through a different location.

A further object of the invention is to provide a twin shoulder belt adjustment mechanism for a child restraint system, including a plurality of vertically spaced apart and slightly vertically offset restraint slots for holding the belts in use, and respective adjustment slits extending laterally therefrom, with a downwardly extending connector slit interconnecting the outer ends of the lateral adjustment slits, such that the twin belts may be moved therethrough to a higher or lower pair of restraint slots to accommodate a different size child.

Still another object of the invention is to provide such a twin shoulder belt adjustment mechanism which is adaptable to an integral child seat module including a module back panel and an adjacent pad.

A still further object of the invention is to provide such a twin shoulder belt adjustment mechanism which includes retention means for blocking off the restraint slots with the twin shoulder belts in place.

These and other objects and advantages of the invention will be more apparent when reference is made to the following drawings and the accompanying description.

BRIEF DESCRIPTION OF THE DRAWINGS

FIG. 1 is a fragmentary perspective view of an automotive bench seat embodying the invention;

FIG. 2 is an enlarged perspective view of a child restraint system embodying the invention;

FIG. 3 is a fragmentary plan view of a portion of the FIG. 2 structure;

FIG. 4 is an exploded, perspective view of a hidden portion of the FIG. 2 structure;

FIG. 5 a fragmentary perspective view of a portion of the FIG. 2 structure illustrating an alternate embodiment of the invention;

FIG. 6 is a side elevational view of a portion of the FIG. 5 structure;

FIG. 7 is an end view of the FIG. 6 structure;

FIG. 8 is a fragmentary perspective view of a portion of the FIG. 2 structure illustrating another embodiment of the invention;

FIG. 9 is a front view of a portion of the FIG. 8 structure; and

FIG. 10 is a side elevational view of the FIG. 9 structure.

BEST MODE OF CARRYING OUT THE INVENTION

Referring now to the drawings in greater detail, FIG. 1 illustrates a vehicle bench seat 10 having a seat portion 12 and a back portion 14. Either one or two side-by-side sections 16 of the back portion 14, each of which embodies a lower segment 18 and an upper segment 20, may be opened into a child restraint module 22, leaving the adjacent sections 24 and 26 of the back portion 14 intact.

The module 22 includes a seat support 28 formed by folding down the lower segment 18, a head support 30 formed by folding up the upper segment 20, and a module back panel 32 mounted against the frame back wall, represented at 34, of the vehicle seat 10. Side supports 36 and 38 are formed by the sides 40 of the respective sections 24 and 26. The seat support 28 includes a plastic seat pad support pan 42 (FIG. 1) mounted on the back surface of the lower segment 18 (as considered in the closed position).

A pair of perpendicularly extending mounting flanges 44 are formed adjacent the rear (FIG. 2) corners of the plastic support pan 42 with axially aligned openings 46 formed therein, adapted to having suitable fasteners 48 extended therethrough to pivotally secure the pad to suitable mounting brackets 50 fixedly secured to extend from the module back panel 32.

A conventional seat belt locking tip 52 (FIG. 2) is connected to a crotch belt 54 which, in turn, is connected to a mounting bracket 56 secured by suitable fasteners 58 through aligned holes 60 to a central mounting portion 62 (FIG. 1) of the plastic seat pad support pan 42.

A conventional seat belt tension adjuster 64 is secured by suitable fasteners, not shown, to a central forward portion 68 of the plastic seat pan 42. A slotted opening 70 is formed at the rear of the mounting portion 68 and the tension adjuster 64, adaptable to having one end portion of a seat belt 72 extending upwardly therethrough and thence forwardly through a slotted opening 74 formed in the seat belt tension adjuster 64. The other end of the seat belt 72 is connected to an inner end of a safety harness including a dividing bracket 76 (FIG. 4) and twin shoulder belts 78 and 80 extending through one of three pairs of oppositely disposed, vertically spaced-apart and slightly laterally offset restraint slots 82a/82b, 83a/83b, and 84a/84b in the back panel 32 (FIG. 3) and secured adjacent the ends of the top portion of a T-shaped connector member 86 (FIG. 1). A conventional seat belt buckle 88 is secured to the center stem of the connector member 86. As may be noted in FIG. 1, the buckle 88 is releasably connected to the locking tip 52 of the crotch belt 54.

Inasmuch as the pairs of restraint slots 82a/82b, 83a/83b and 84a/84b are vertically spaced and laterally offset, it may be noted that, with the belts 78 and 80 mounted therethrough, they serve to accommodate children of different heights and substantially proportionate shoulder widths.

A pad 90 (FIG. 2) having respective seat and back segments 92 and 94 connected by a flexible hinge 96, is removably mounted on the pan 42 and against the back panel 32, as shown in FIG. 2. Openings 98, 99 and 100 are formed in the seat segment 92 for alignment with the portions 62, 70 and 68, respectively, of the plastic seat pan 42, and slightly laterally offset restraint slots 102a/102b, 103a/103b, and 104a/104b are formed in the back segment 94 for alignment with the restraint slots 82a/82b, 83a/83b, and 84a/84b, respectively.

As illustrated in FIGS. 2 and 3 as part of a transfer slit arrangement, a plurality of adjustment slits 106a/106b, 107a/107b, and 108a/108b extend laterally from one end of each of the restraint slots 82a/82b, 83a/83b, and 84a/84b, respectively, in the module back panel 32. Completing the transfer slit arrangement the outermost ends of the respective sets of adjustment slits are interconnected by downwardly extending connector slits 110, which extend below the respective lowest alignment slits 108a/108b a distance equal to the width of the belt 78 and 80.

Adjustment slits 112a/112b, 113a/113b, and 114a/114b, matching the respective slits 106a/106b, 107a/107b, and 108a/108b, are formed in the back segment 94 of the pad 90 to extend laterally from the restraint slots 102a/102b, 103a/103b, and 104a/104b, respectively. There are no downwardly extending slits formed in the back segment 94 in alignment with the slits 110 in the back panel 32, inasmuch as, once the twin belts 78 and 80 are positioned in selected restraint slots 82a/82b, 83a/83b or 84a/84b, the flexible and separate pad 90 may be bent so as to slide sidewardly onto the belts 78 and 80 through the respective adjustment slits 112a/112b, 113a/113b or 114a/114b to mount in the respective restraint slots 102a/102b, 103a/103b, and 104a/104b.

By virtue of the respective horizontally aligned sets of restraint slots and adjustment slits, the twin shoulder belts 78 and 80 may be slid out of any one pair of restraint slots, laterally through the adjacent set of adjustment slits, and thence upwardly or downwardly through the downwardly extending connector slits 110 into a different pair of restraint slots, as required to accommodate the particular height and shoulder width of a toddler who is being placed in the child restraint module 22.

A plurality of mating Velcro strips, or other suitable hook and loop tape strips, represented at 118, are secured to the underside of the seat segment 92 and the upper side of the plastic seat pan 42, respectively, to hold the seat segment in place. Likewise, a plurality of mating Velcro strips, or other suitable hook and loop tape strips 120 are secured to the back side of the back segment 94 and the front side of the back panel 32, respectively, to hold the back segment in place.

A suitable latch arrangement (not shown) having an actuator means, represented at 122 (FIG. 2), adjacent the back wall 34 and behind the upper segment 20, (FIG. 1) serves to provide the disengagement of the lower segment 18 to fold down into the position shown in FIG. 1. Once the latter is folded down, the upper segment 20 is raised in an upward arcuate movement to attain the head support 30 position, wherein it becomes locked in place by a second suitable latch arrangement (not shown).

After use, and when no toddler is on board, the head support 30 is folded down and the seat support 28 and the associated support pan 42 are folded up in an arcuate motion to resume the function of being a portion of a normal automotive seat back against the back panel 32 between the sides 40, to complete the seat back structure.

Referring now to FIGS. 5-7, there is illustrated an alternate embodiment of the twin shoulder belt adjustment feature. In this embodiment, a leaf spring type retention member 124 is pivotally mounted at the upper end thereof by any suitable pivot means 126 on an upper portion of the module back panel 32, and adapted to being pivoted so as to assume a position adjacent to and in alignment with the downwardly extending slits 110, to block off the belts 78 and 80 mounted in any pair of restraint slots 82a/82b, 83a/83b or 84a/84b. A suitable fastener, such as a pin or screw 128, is secured adjacent the bottom bent end portion 130 of the rod 124. The pin 128 is mountable in an opening 132 formed in the back panel 32, serving to retain the retention member 124 in its blocking position. The member 124 is merely bowed outwardly, as shown in FIG. 7, to retract the pin 128, and pivoted out of the way when it is desired to change the location of the twin belts 78 and 80, after which it is replaced. A stop member 134 may be molded onto the back panel 32 to help assure the proper location of the bent end portion 130.

Referring now to FIGS. 8-10, there is illustrated another embodiment of the adjustment feature. In this embodiment, a retention rod 136 is pivotally secured at the upper end thereof by suitable pivot means 138. The rod is bent so as to present a central portion 140 (FIG 110) into the downwardly extending slit 110 (FIG. 8) to block off the belts 78 and 80 mounted in any one of restraint slots 82a/82b, 83a/83b or 84a/84b. The lower end 142 of the rod 136 is bent and formed to include a loop 144, which is mountable on a suitable pin or screw 146 (FIG. 8). As with the retention member 124 of FIG. 7, the rod 136 is bowed outwardly and pivotted to permit changing the location of the belts 78 and 80.

In either the FIGS. 5-7 or 8-10 embodiments, if desired, the adjustment slits 106a/106b, 107a/107b and 108a/108b may be omitted, as shown in FIGS. 5 and 8.

INDUSTRIAL APPLICABILITY

Inasmuch as the restraint slots are offset laterally, in addition to being located at different height levels, it should be apparent that the invention provides a twin shoulder belt adjustment mechanism which accommodates not only toddlers of different heights, but also their correspondingly different shoulder widths.

It should be apparent that the invention provides a twin shoulder belt adjustment mechanism for a child restraint system, wherein the adjustment may be easily and quickly accomplished to accommodate the toddlers of varying heights and shoulder widths.

It should be further apparent that either more or less than three pairs of oppositely disposed vertically spaced apart restraint slots may be incorporated in the child restraint system.

While but two embodiments of the invention have been shown and described, other modifications thereof are possible within the scope of the following claims.

The embodiments of the invention in which an exclusive property or privilege is claimed are defined as follows:

1. A twin shoulder belt adjustment mechanism for a child restraint system including a back panel, a seat support means, and twin shoulder belts operatively connected between said back panel and said seat support means to restrain a child positioned on the seat support means and against the back panel; said twin should be belt adjustment mechanism comprising two oppositely disposed sets of vertically spaced apart restraint slots, forming laterally aligned pairs of said slots in said back panel, and transfer slit means communicating between each of common ends of the restraint slots of each set and adapted to retain said twin shoulder belts in said restraint slots and extending at one end thereof beyond an endmost restraint slot, said twin shoulder belts being operatively mounted through any one of said pairs of oppositely disposed restraint slots, and movable to a higher or lower pair of restraint slots through said transfer slit means.

2. The twin shoulder belt adjustment mechanism described in claim 1, wherein said transfer slit means is narrower than said restraint slots and include an adjustment slit extending laterally from an end of each restraint slot, and a downwardly extending connector slit interconnecting the distal ends of each of said set of adjustment slits and wherein said connector slit extends at one end thereof beyond an endmost adjustment slit.

3. The twin shoulder belt adjustment mechanism described in claim 1, wherein each successively lower pair of said oppositely disposed sets of restraint slots is positioned progressively closer together.

4. The twin shoulder belt adjustment mechanism described in claim 1, wherein said seat support means includes a downwardly pivoted portion of an automotive bench seat and a plastic support pan mounted on the upper surface of said portion.

5. The twin shoulder belt adjustment mechanism described in claim 4, and a pad mounted on said plastic support pan and against said back panel, and restraint slots and adjustment slits formed in said pad so as to substantially match said slots and slits in said back panel both in width and alignment, with said adjustment slits extending to the edge of said pad.

6. The twin shoulder belt adjustment mechanism described in claim 1, and retention means pivotally connected at its upper end to said back panel and operatively connectable to said connector slit to block off said shoulder belts mounted in any pair of restraint slots.

7. The twin shoulder belt adjustment mechanism described in claim 6, wherein said retention means is a leaf spring type member, and fastener means at the bottom end thereof.

8. The twin shoulder belt adjustment mechanism described in claim 6, wherein said retention means is a rod including a bent portion adapted to being fitted into said connector slit.

* * * * *